United States Patent [19]
Filion et al.

[11] Patent Number: 5,778,183
[45] Date of Patent: *Jul. 7, 1998

[54] APPARATUS AND METHOD OF AUTOMATICALLY TRANSMITTING EVENT-RELATED INFORMATION TO A USER OF A NETWORK PRINTING SYSTEM

[75] Inventors: Joseph L. Filion, Fairport, N.Y.; Charles F. Evans, Norwood, Mass.; Kenneth E. Rohlfing, Honeoye Falls, N.Y.; Diane S. Rogerson, Greece, N.Y.; Kitty S. Koul; Mei-Yuei Lee, both of Pittsford, N.Y.; Craig W. Jacobs, Fairport, N.Y.

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 489,347
[22] Filed: Jun. 12, 1995
[51] Int. Cl.$^6$ .................................................. G06F 15/16
[52] U.S. Cl. ........................ 395/200.53; 395/200.32; 395/200.49
[58] Field of Search ........................ 395/800, 200, 395/200.32, 200.49, 200.53

[56] References Cited

U.S. PATENT DOCUMENTS

| | | | |
|---|---|---|---|
| 3,597,071 | 8/1971 | Jones | 355/3 |
| 4,821,107 | 4/1989 | Naito et al. | 358/256 |
| 5,021,892 | 6/1991 | Kito et al. | 358/468 |
| 5,047,955 | 9/1991 | Shope et al. | 364/519 |
| 5,170,340 | 12/1992 | Prokop et al. | 364/143 |
| 5,175,633 | 12/1992 | Saito et al. | 358/406 |
| 5,220,674 | 6/1993 | Morgan et al. | 395/800 |
| 5,223,948 | 6/1993 | Sakurai et al. | 358/404 |
| 5,301,262 | 4/1994 | Kashiwagi | 395/117 |
| 5,307,458 | 4/1994 | Freiburg et al. | 395/162 |
| 5,367,635 | 11/1994 | Baner et al. | 395/200 |
| 5,491,796 | 2/1996 | Wanderer et al. | 395/200 |
| 5,559,933 | 9/1996 | Boswell et al. | 395/114 |

FOREIGN PATENT DOCUMENTS

| | | | |
|---|---|---|---|
| 529818A2 | 3/1993 | European Pat. Off. | |
| 653700A1 | 5/1995 | European Pat. Off. | 395/114 |
| 1531401 | 11/1978 | United Kingdom | |

OTHER PUBLICATIONS

Nye, Xlib Programming Manual, O'Reilly and Assoc., pp. 5,16,17,250, Mar. 1993.

Softbase Reviews, Xprinter 3.0, Info Sources Inc., Mar. 1992.

Nye(2), Adrian Nye, X Protocol Reference Manual, O'Reilly & Assoc., pp. 6–7,11–12,29–30, Jul. 1989.

Xprinter, Softbase, Xprinter 3.0, Info Sources Inc., p. 1, Mar. 1992.

*Primary Examiner*—Alvin E. Oberley
*Assistant Examiner*—R. S. Rosenhalm
*Attorney, Agent, or Firm*—Gary B. Cohen

[57] ABSTRACT

An automatic transmitting system for use in a networked printing system including a first client, second client and server. The automatic transmitting system includes an agent, operatively associated with the server, for maintaining information regarding a plurality of subsystems associated with a printing machine—the agent communicates with both the first and second clients. The automatic transmitting system further includes a registration system, including the first client, the second client and the agent, for registering the information. The information includes a first identifier and a second identifier, the first and second identifiers being stored with the agent and corresponded with first and second sets of information, respectively. In practice, the agent transmits the first set of information exclusively to the first client when a first event occurs in one or more of the plurality of subsystems and transmits a second set of information exclusively to the second client when a second event occurs in one or more of the plurality of subsystems.

5 Claims, 7 Drawing Sheets

APPARATUS AND METHOD OF AUTOMATICALLY TRANSMITTING EVENT-RELATED INFORMATION TO A USER OF A NETWORK PRINTING SYSTEM

The present invention relates generally to a technique for monitoring the occurrence of selected events in a printing system and more particularly to a networked arrangement with a first client, a second client and a server in which a packet of information, indicating the occurrence of an event, is automatically transmitted by the server, over the network, to a selected one of the first client and the second client, in response to the event occurring.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 170,340

Patentees: Prokop et al.

Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:

U.S. Pat. No. 5,047,955

Patentees: Shope et al.

Issued: Sep. 10, 1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071

Patentee: Jones

Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107

Patentees: Naito et al.

Issued: Apr. 11, 1989

U.S. Pat. No. 5,021,892

Patentees: Kita et al.

Issued: Jun. 4, 1991

U.S. Pat. No. 5,175,633

Patentees: Saito et al.

Issued: Dec. 29, 1992

U.S. Pat. No. 5,223,948

Patentees: Sakurai etal.

Issued: June 29, 1993

U.S. Pat. No. 5,307,458

Patentees: Freiburg et al.

Issued: Apr. 26, 1994

U.S. Pat. No. 4,821,107 discloses a multifunctional image apparatus which is operable in one of various office automation modes, such as copy mode, facsimile mode, printer mode and the like. The multifunctional imaging apparatus is comprised of an image reading section, an image forming section and a communication section for transmitting and receiving image data.

U.S. Pat. No. 5,175,633 and U.S. Pat. No. 5,307,458, respectively, disclose systems that exploit a coprocessor to access, among others, facsimile and communication functions. In the latter of these patents, a plurality of input/output devices reside on a common bus with a video processor, with the video processor using an electronic precollation scheme. In the '458 patent, a first set of image data is processed in the video processor while a second set of image data is buffered in the coprocessor. An arbiter permits the coprocessor to have the bus, for a selected interval, to process the second set of image data in the video processor.

Digital copiers typically seek to optimize concurrency and/or multi-tasking in operation. Xerox'DocuTech® optimizes multitasking by using a plurality of processors to operate individual services, such as scanning, printing, storing and decomposing, simultaneously. Accordingly, in one example, a document can be scanned while another document is being printed. Even though this sort of multitasking is desirable, it requires a substantial amount of both processing capability and storage space. A printing system, with an architecture of substantially smaller scale than DocuTech®, may be found in the following patent:

British Patent 1,531,401

Patentees: Davy et al.

Publication Date of Complete Specification: Nov. 8, 1976

British Patent 1,531,401 discloses a system with a bus to which an input section, precollation memory and an output section are operatively coupled. Each of the input section and the output section includes a set of buffers and a direct memory access (DMA) interface. One DMA interface serves to transfer a first set of buffered data from one of the input buffers to the precollation memory while another DMA interface serves to transfer a second set of data from the precollation memory to one of the output buffers. Another patent that uses an architectural concept similar to that of the '401 British patent can be found in the following reference:

U.S. Pat. No. 5,301,262

Patentee: Kashiwagi

Issued: Apr. 5, 1994

The '262 patent, in contrast to the '401 British patent, compresses image data, prior to storing it in a page buffer, and decompresses the image data, prior to outputting it.

As disclosed by the following patent, the pertinent portions of which are incorporated herein by reference, printing-related subsystems may be interconnected via a local area network (LAN):

U.S. Pat. No. 5,367,635

Patentees, Bauer et al.

Issued: Nov. 22, 1994

Local area networks may be interconnected into still larger systems spanning a floor or building, a group of buildings (campus), a region, or larger areas on up to worldwide systems. Each LAN may have a different hardware interconnection technology and multiple network protocols. A simple isolated LAN may be administered by individual users. That is, users may change equipment, install software, and diagnose problems. Large complex LANs or large groups of interconnected LANs require "management". "Management" refersto both a human network manager and software used by the human manager. In this application, "management" refers to software for managing the overall system, and "user" refers to a person using the network management software. The user is usually the system administrator. Users can obtain management data and alter management data on the network by using network management software.

Large network systems are typically dynamic with continual requirements for addition and deletion of equipment, updating of software, and detection and analysis of problems. In general, there may be a variety of systems from a variety of vendors with a variety of system owners. Management software is designed to be as general as possible. However, as the overall system changes, the user may need information or control capabilities not anticipated by the designers of the management software. Management software needs to have a provision for adding new user defined capabilities for information gathering and control.

Current network management software is typically defined in terms of software objects. A software object is a way of organizing data. An object may have a value or associated data. An object may have an associated executable software process for generating data or for control purposes. A user can retrieve or alter the data associated with an object. Network management objects are uniquely identified by object identifiers.

An agent is software running as a background process on each of the target devices. When a user requests management data from a device on the network, management software will send an object identification in a management packet or frame to the target agent. The agent will interpret the object identification, retrieve data associated with the object identification, and send the data in a packet back to the user. Sometimes, a corresponding process may be invoked to retrieve data.

Current network management agent software is typically sold with a hierarchy of fixed pre-defined objects. There are typically no provisions for a user to add or modify objects. Some management software provides "extensible" agents. "Extensible" typically means that a user has access to source code for the agent and can modify the source code and recompile. Alternatively, the user may write additional code in a programming language which requires compilation but may not be required to recompile the original agent. In either case, writing source code in a programming language and compilation of the source code is required. There is a need for users to have the capability to add objects and associated processes without having to write code in a programming language requiring compilation.

There are numerous standards organizations which are attempting to standardize computer networking. The International Organization for Standardization (ISO) has provided a general reference framework called the Open System Interconnection (OSI) model. The OSI model for a network management protocol is called Common Management Information Protocol (CMIP). CMIP is a common network management protocol in Europe. In the United States, a more common network management protocol is a related variation of CMIP called the Simple Network Management Protocol (SNMP) (see Marshall T. Rose, The Simple Book, Prentice-Hall, 1991).

In the SNMP network management terminology, a network management system contains at least one network management station (NMS), several managed nodes, each containing an agent, and a network management protocol which is used by the management station and the agents to exchange management information. A user can obtain data and alter data on the network by using network management software on the NMS to communicate with agent software in the managed nodes.

Software for agents conforming to SNMP standards is commercially available. Agent source code is also available without charge from universities. For example, a source code SNMP development kit (hereinafter referred to as the "MIT code") is available from the following source:

James R. Davin

Advanced Network Architecture Group

M.I.T. Laboratory for Computer Science

545 Technology Square

Cambridge, Mass. 02139

The SNMP defines a structure for a management database (a collection of objects) called the Management Information Base (MIB). Objects in a MIB have names (OBJECT IDENTIFIERS) and data structures (OBJECT TYPES). An object identifier is a sequence of non-negative integer values which signify a path through a tree structure of numbered branches (called sub-identifiers). Each sub-identifier is a non-negative integer. For example, the object identifier 1.3.6.1.4.1.11.2.12 identifies an object found by starting at the root, moving to the branch with the sub-identifier 1, moving to a subordinate branch with the sub-identifier 3, and so forth. The first 6 levels of this example are defined by the standard model. In the example, the branch identified by the first five sub-identifiers (1.3.6.1.4) is the standard SNMP defined branch called "private". The next sub-identifier (1) is for a branch (called "enterprises") reserved for vendor specific objects. The next label (11) is reserved for Hewlett Packard.

Information is retrieved from an agent by sending a SNMP GET or GET-NEXT request with an object identification as a parameter. Data associated with an object can be altered by sending a SNMP SET request to the agent with the object identification as one parameter and the data as another parameter. An object which can be written to is called a "settable" object.

The MIT code includes a function (named "misExport( )") for registering (attaching or grafting) an object to the object tree structure. There are 4 parameters as follows:

name: (the object identifier)

namelen: (the number of sub-identifiers in the object identifier)

ops: (a list of 6 routines (corresponding to the operations RELEASE, CREATE, DESTROY, and SNMP requests GET-NEXT, GET, and SET) which can be performed on management objects) cookie: (a pointer to stored parameters associated with the specific object identifier within a data structure internal to the agent).

MIB standards evolve as required by the industry. Proposed MIB standards start as published requests for comments. A MIB format for defining objects is specified in Request For Comments number 1212 (hereinafter referred to as "RFC 1212") and an example MIB standard using that format is specified in Request For Comments 1213 (hereinafter referred to as "RFC 1213"). Both are available from the following source:

DDN Network Information Center

SRI International

Room EJ291

333 Ravenswood Avenue

Menlo Park, Calif. 94025

The RFC 1212 object-type notation requires a series of textual clauses as follows:

SYNTAX: (examples are "INTEGER" and "OCTET STRING")

ACCESS: (choices are: "read-only", "read-write", "write-only", and "not-accessible")

STATUS: (the required choice for status in a commercial product is "mandatory". In an experimental MIB, the word "optional" is allowed.)

DESCRIPTION: (A textual explanation of the object delimited by quote marks.)

In a network printing system, it is believed that determining, at a client workstation, when an event, e.g. completion of a print job, has transpired at a remote printer is not achieved readily unless, of course, bi-directional communication exists between the client and the remote printer. In those cases where only unidirectional communication exists between the client and the remote printer, however, the remote printer cannot "speak to" the client directly. In one example, a user can query a server, from a workstation, in a Xerox Network Service arrangement to determine when a network job has completed printing. The server in such arrangement, however, is not configured to automatically notify the user, at the workstation, of printing completion.

It is believed that Hewlett-Packard Corporation uses an approach in which an SNMP trap is employed to inform a group of network clients regarding the occurrence of an event at a printer that is remote to each of the clients. More particularly, each of the group of clients registers with a mutually accessible agent to receive a message each time one of an event set occurs. Accordingly, when one of the events in the event set occurs, the agent transmits a trap or message to each of the clients in the group.

It is understood that Novell Corporation provides a network arrangement in which a client provides a personal identifier to a network server sometime prior to printing a job. Subsequent to providing the identifier, the client sends a job to a remote printer by way of the network server. In turn, the network server delivers the job to the remote printer and when printing of the job is complete, a notice is provided to the network server, by the remote printer, indicating that printing of the job has been completed. In response to such indication, the network server provides a message to the client for letting it know of such completion.

While, for the most part, the approach employed by Hewlett-Packard, as described above, is advantageous for the group as a whole, it can create an annoyance in certain situations. For example, in a group including a first user and a second user, the print job belonging to the first user may be completed at a printer remote to both users. In the above-described approach, it is understood that both users will receive a trap or message indicating that the job of the first user has been completed. Under ideal circumstances, however, the second user would prefer not to hear about the occurrence of events that effect only the first user. Additionally, the approach employed by Novell, as described above, appears to be inappropriate for use with a remote printer employing a print queue. That is, when the print queue is employed, it is not believed that the Novell network server has any way of knowing when printing of a job in the queue is completed. Moreover, the Novell approach appears somewhat limited in application since it is platform dependent. It would be desirable to provide a system that is platform independent in which a message regarding the occurrence of an event at a printing machine (or any output device) employed by and remote to a group of users is transmitted only to the specific recipient affected by such occurrence.

In accordance with the present invention, there is provided an automatic transmitting system for a printing system including a printing machine associated with a plurality of subsystems, the printing machine being operatively coupled with a print server, the print server communicating with both a first client and a second client, via a network connection. The automatic transmitting system, which is intended for use in automatically transmitting a set of information to a selected one of the first and second clients, includes: an agent operatively associated with the print server, for maintaining information regarding the plurality of subsystems, the agent communicating with both the first and second clients; and a registration system, including the first client, the second client and the agent for registering the information, the information including a first identifier and a second identifier, the first and second identifiers being stored with the agent and corresponded with first and second sets of information, respectively. In practice, the agent transmits the first set of information exclusively to the first client when a first event occurs in one of the plurality of subsystems and transmitting a second set of information exclusively to the second client when a second event occurs one or more of the plurality of subsystems.

In accordance with another aspect of the invention, there is provided an informing system for a printing system which performs a plurality of print-related functions and includes a print server communicating with a client by way of a network connection, the client being under control of a user. The informing system, which employs the print server to inform the client that an event associated with one of the plurality of print-related functions has occurred, includes: an agent operatively associated with the print server, a first identifier portion being stored at said agent; a source of identifier portions, said source providing a second identifier portion; a storage area, communicating with said source, for storing the second identifier portion; and a process, associated with one of the print-related functions, for conveying the second identifier portion to said agent when the event occurs;. In practice, said agent combines the second identifier portion with the first identifier portion to form a resultant identifier, the resultant identifier corresponding with a packet of information indicating that the event has occurred; said agent transmits the packet of information to the client; and in response to receiving the packet of information, the client informs the user of the occurrence of the event by reference to the information of the packet received at the client.

These and other aspects of the invention will become apparent from the following description, the description being used to illustrate a preferred embodiment of the invention when read in conjunction with the accompanying drawings.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
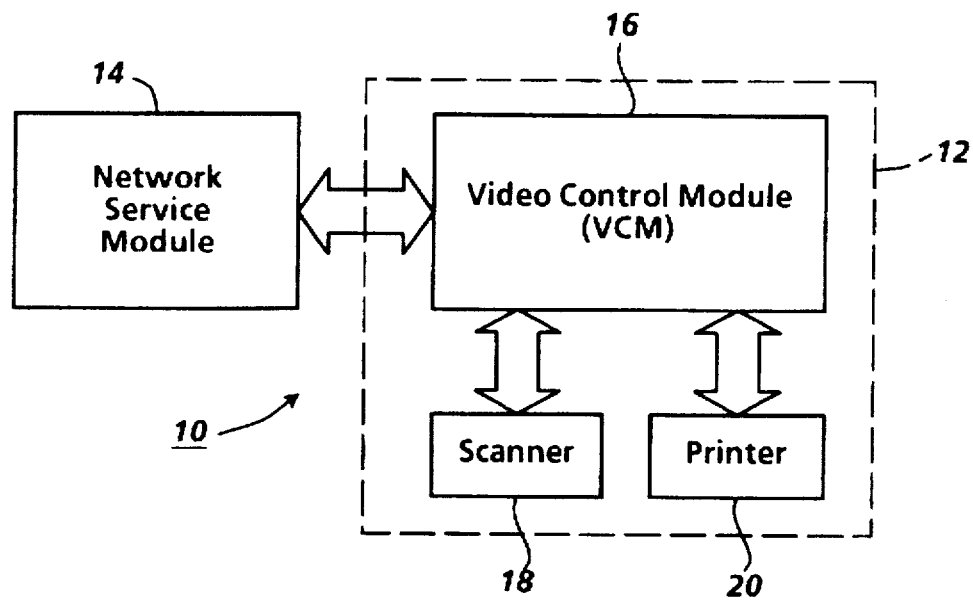
FIG. 1 is a block diagram depicting a multifunctional, network adaptive printing machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
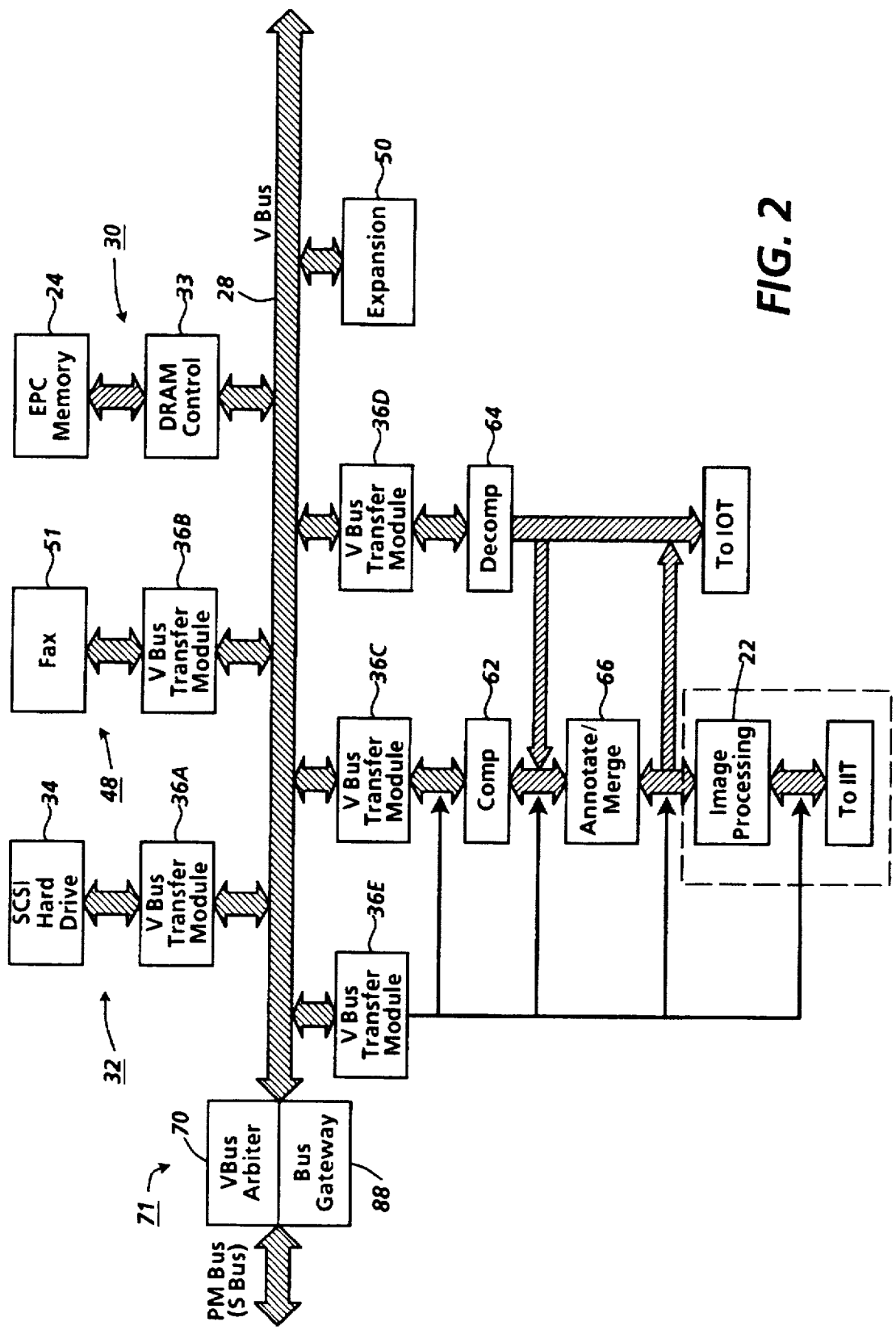
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
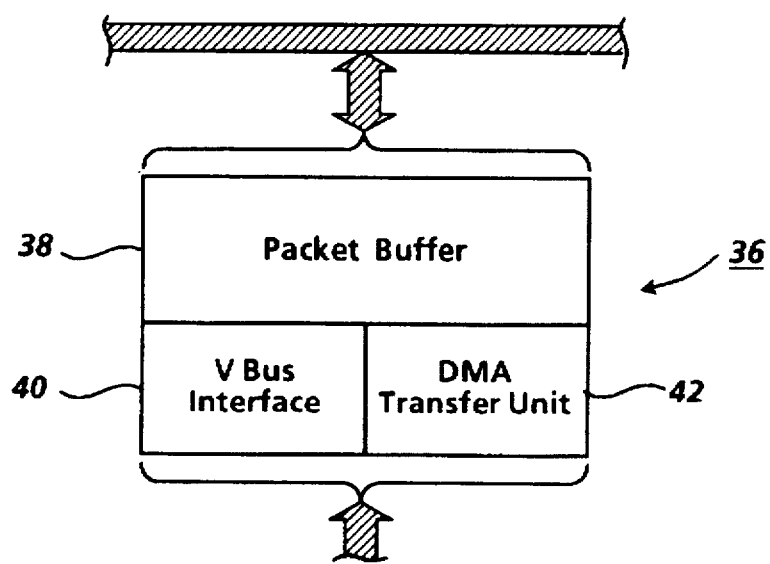
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can be programmed to handle packets of up to 64 Bytes Preferably, the packet size would be reduced for times when the VBus is relatively busy and increased for times when activity on the bus is relatively low.

Figure 5:
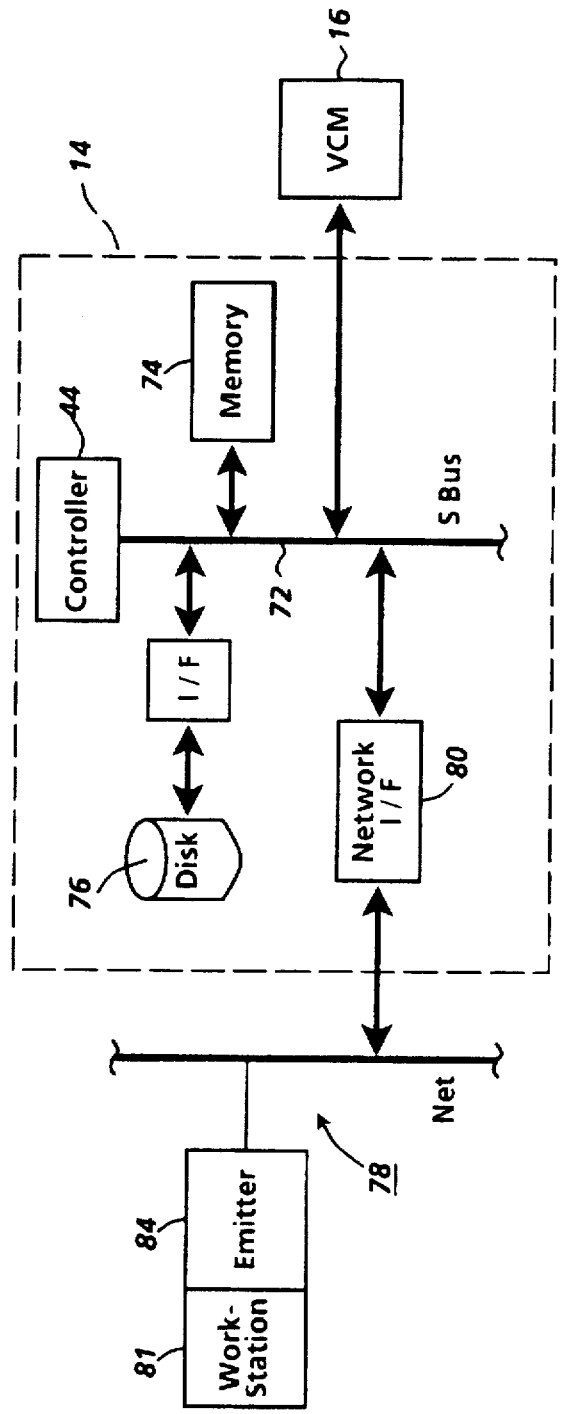
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below More particularly, each image the DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
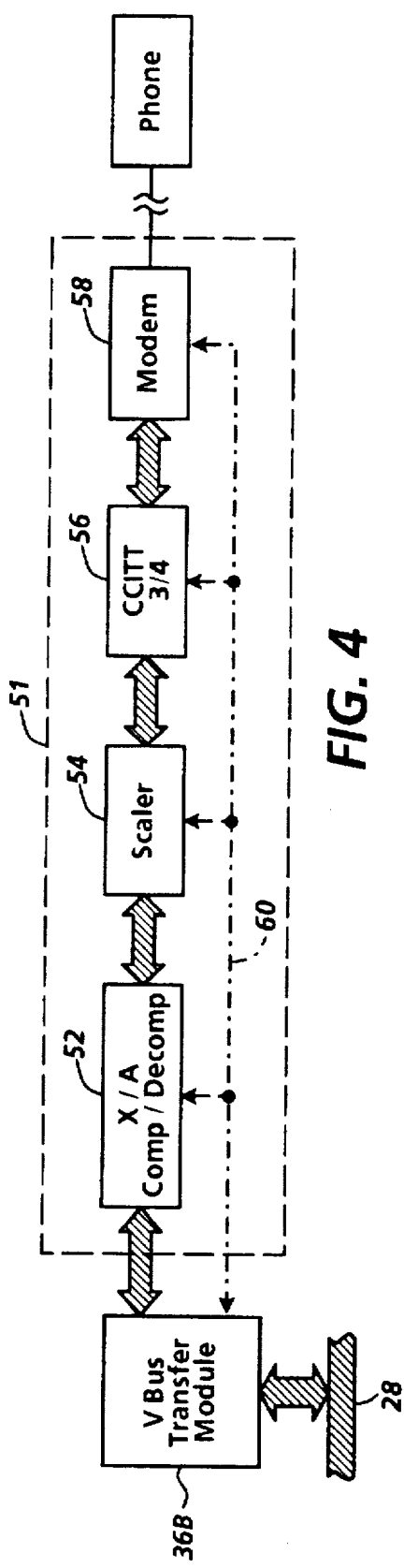
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 81 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 2, 3 and 5, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet tranfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 6:
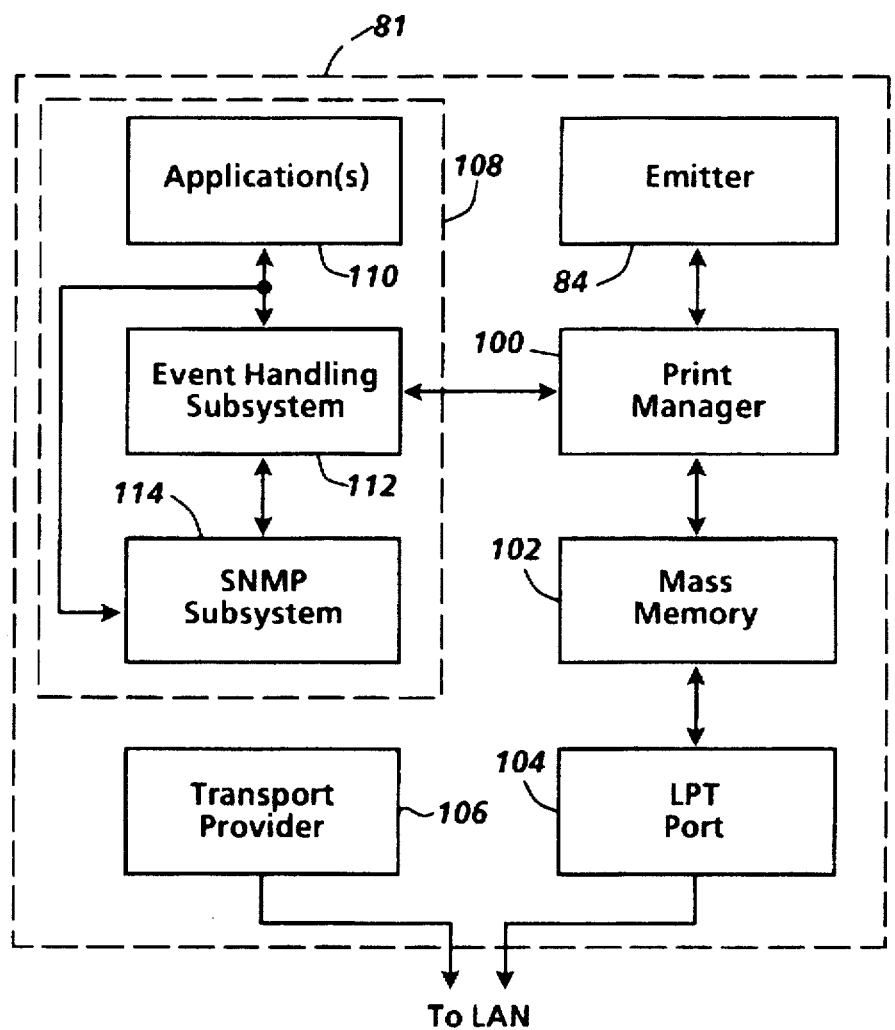
FIG. 6 is a block diagram of the client workstation shown in FIG. 5.

Referring to FIG. 6, one of the workstations 81 is described in further detail. In particular, each workstation 81 includes the emitter 84 which facilitates generation of a job and communicates with a print manager 100. As is known, the emitter 84 obtains input from a user and converts the same into a page description language, such as PCL 5 or Post Script. In one embodiment, the emitter is produced by Phoenix Corporation. Preferably, the print manager 100 is a process capable of receiving a job and spooling it with a mass memory section (e.g. disk drive device) 102.

As discussed in further detail below, a spooled job is communicated to a local area network by way of a line printer (LPT) port 104. Jobs are transported across the network by way of a transport provider 106 which preferably employs either UDP or IPX protocols. The former protocol is based on TCP/IP and the latter protocol is provided by way of Novell Corporation.

An event handling system 108 is provided to determine when selected events in the printing system 10 have occurred. The event handling system includes one or more applications 110, an event handling subsystem 112 and a simple network management protocol (SNMP) subsystem 114. While the workstation 81 may include multiple applications 110 for handling various tasks associated with monitoring event occurrence within the printing system, hereinafter, for purposes of convenience, only one application for performing the various tasks associated with event handling will be referenced. The event handling application 110 communicates with the event handling subsystem 112 which event handling subsystem communicates with the emitter 84 by way of the print manager 100 and is provided with two major responsibilities, each of which responsibilities will be discussed in further detail below. The SNMP subsystem, which communicates with the event handling subsystem, serves to encode and decode packets of information provided in terms of SNMP.

Figure 7:
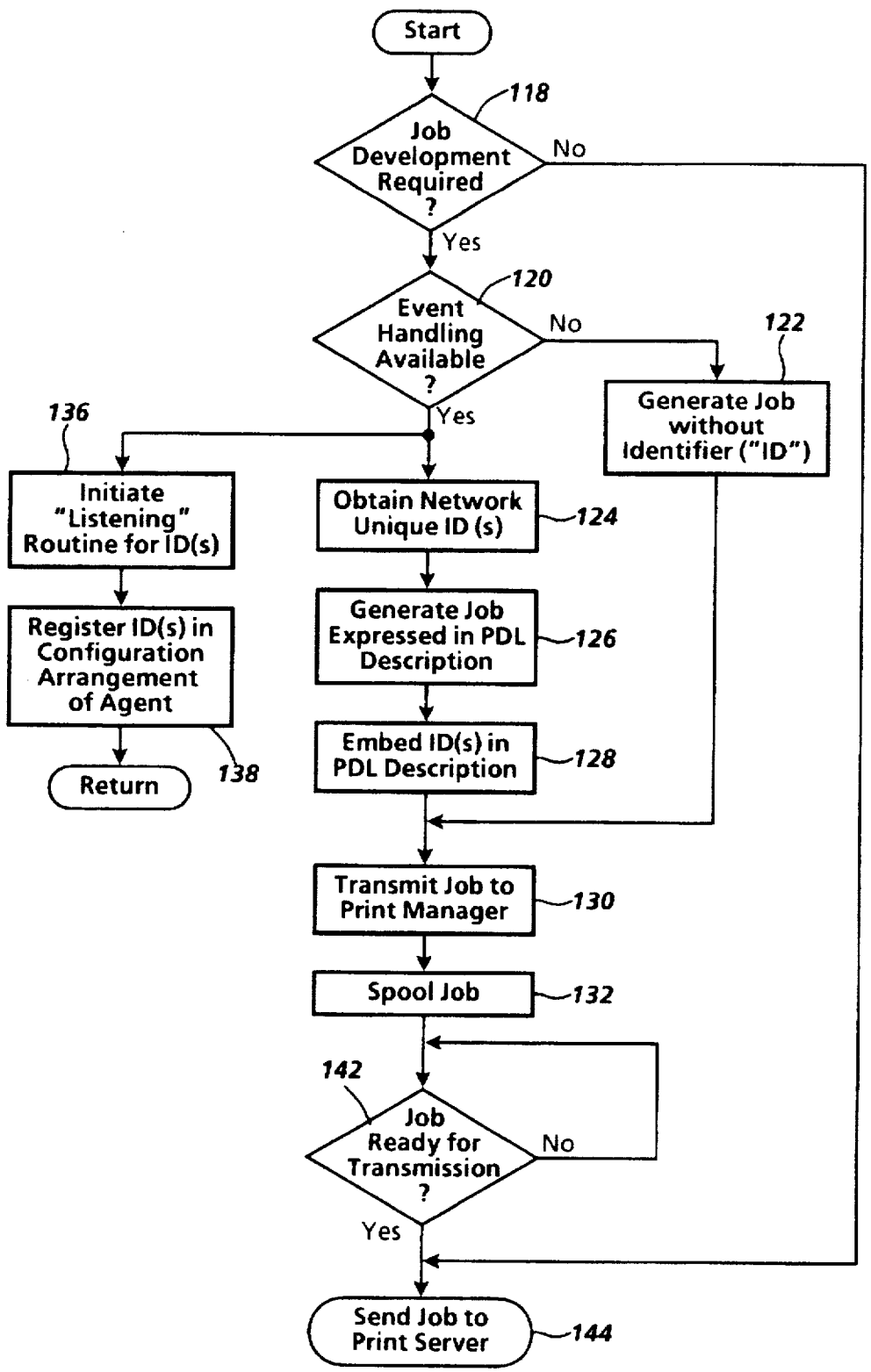
FIG. 7 is a flow diagram of a technique, depicting development of a job at the client workstation of FIG. 6, in which a network unique identifier is embedded in the job.

Referring to FIG. 7, an approach for generating a Job, which employs SNMP to manage event handling, is provided. Initially, at step 118 a job is developed at the emitter 84 in response to appropriate input by the user. In some cases, a job need not be developed in that it already resides on a portable medium. When this is the case, the job is provided to the server. Assuming that job development is required, at step 120 it is determined whether the workstation provides event handling. For those circumstances in which event handling is not provided, the job is, via step 122, provided without an identifier. In the illustrated embodiment of FIG. 7, an identifier comprises an object identifier (OID) Suffix, i.e. a portion of an OID of the type used in SNMP communication.

Preferably, event handling is provided, in the workstation 81, by default, therefore a unique network OID suffix is communicated to the print manager 100 (step 124) from the event handling subsystem 112. In one example, the OID suffix is based on a client address or ethernet card identifier. It should be appreciated, that more than one OID suffix could be obtained by the print manager in order to obtain information about the occurrence of multiple events in the printing system. For ease of discussion, it will be assumed that one OID suffix is obtained and that that OID suffix relates to an event in which a developed job is outputted at an output device. Nonetheless, the event to which the OID suffix pertains could be one of many events associated with the printing system. With the OID suffix in hand, the emitter 84 generates the job in terms of a PDL description (step 126), which PDL description will include a comment section of the type disclosed in U.S. Pat. No. 5,130,806 to Reed et al., the pertinent portions of which are incorporated herein. Per step 128, the emitter 84 embeds the OID suffix into the comment section of the PDL description and transmits a job to the print manager 100 (step 130) for spooling of the job (step 132) in the mass memory 102.

Figure 8:
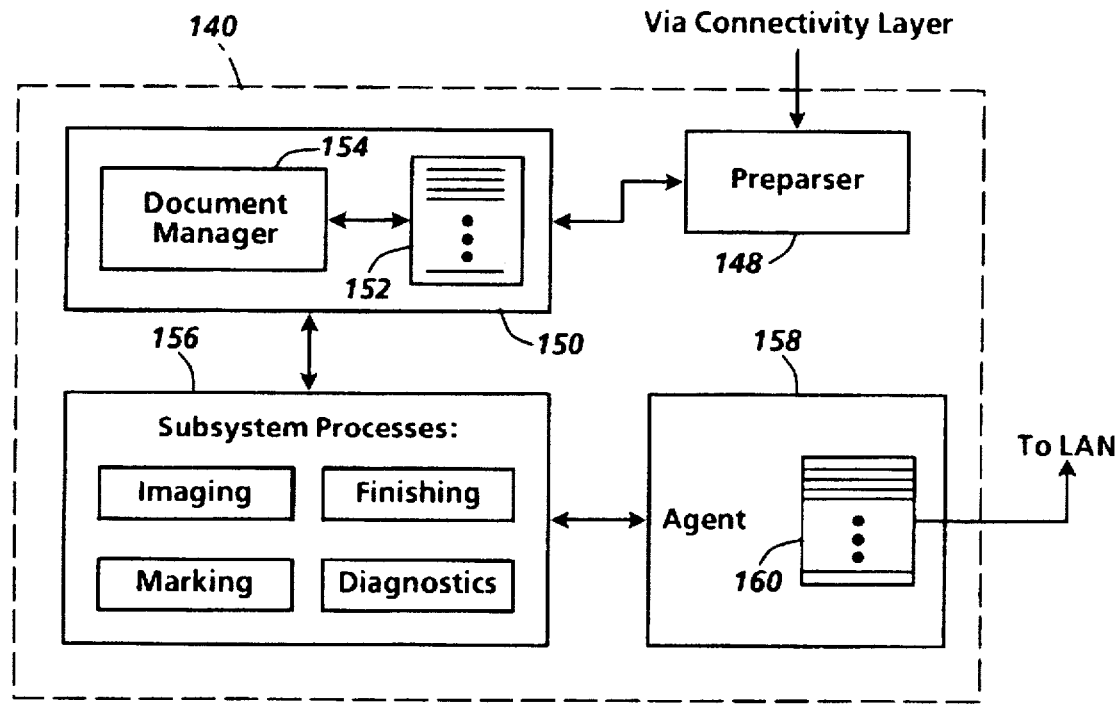
FIG. 8 is a block diagram of a print server associated with the network module of FIG. 5.

Referring back to step 120, the event handling system performs certain functions in conjunction with the development of the job. More particularly, the application 110 initiates a "listening routine" at step 136 and the event handling subsystem 112 registers the OID suffix (step 138) at a print service 140 (FIG. 8). Referring now to step 142 and FIG. 6 when a job is ready for transmission from the client workstation 81 to the server 140, the job is transmitted to the service 140, by way of step 144, in the following manner:

When submitting the job through the emitter 84 (which is preferably a windows print driver), the emitter submits the job back to an operating system of the workstation 81 which then sends the job through the LPT port 104. Since the LPT port is redirected to a networked printer, of the type used in printing system 10 (FIG. 1), the job is ultimately submitted to networked printer 20. The emitter software, however, has no knowledge of this redirection and has no direct contact with the printer 20. As will appear from the discussion below, through use of SNMP traps, the client workstation 81 is able to obtain information about the occurrence of events in the printing system even though communication between he workstation and the print server is not, in conventional terms, viewed as bidirectional.

In practice, the job is transmitted across the network to the network module 14 for interpretation at the print server 140. Preferably, the print service 140 is maintained in one of the memory sections 74 or 76 (FIG. 5). In one example of operation, the print service 140 is transferred from disk 76 to system memory 74. As shown in FIG. 8, the print service 140 includes a preparser 148 for parsing the various image components of a job. The structure and function of the preparser 148 is discussed in further detail in U.S. patent application Ser. No. 07/898,761, filed by Bonk .et al. on Jun. 12, 1992, the pertinent portions of which are incorporated herein. As further discussed in the Bonk application, the preparser 148 would be responsible for stripping the OID suffix from the PDL description of the job for storage in a document management section 150. It will be appreciated that the print service 140 includes other interpretation components, such as a process for binding fonts, which are not shown in the FIG. 8. Nonetheless, the components necessary to achieve interpretation of a PDL file are known to those skilled in the art and can be obtained through use of conventional interpretive schemes such as those schemes provided, among others, Phoenix, Adobe Corporation or Hewlett-Packard Corporation.

It is contemplated that the print service 140 will preferably employ an implementation known as the ISO document processing architecture (DPA) standard as envisioned by ISO/IEC 10175. The DPA has its origin in the Palladium print system which is a distributed print system developed at MIT/Project Athena with the participation of Digital Equipment Corporation, International Business Machines and Hewlett-Packard. The "Palladium Design Document" a publication of the Massachusetts Institute of Technology, published on June, 1991, provides a detailed discussion of the ISO DPA. The Palladium print system is based on a two level client-server model. Both Print Spooler and Printer Supervisor act as servers. The Print Spooler also acts as a client to the Printer Supervisor. The Print Client normally uses the Print Spooler as its server but may use the Printer Supervisor directly. Remote Procedure Calls are used for communications between the clients and servers. Each Printer has its own dedicated Printer Supervisor which communicates data and control information with the printer in whatever way is appropriate for that type of printer. A name service is used to find printer services for users and to find servers for system managers. There is no design limit to the number of servers that may be installed on a machine.

A Print Client is a client acting as the user's agent that accepts commands, submits requests to print services, receives responses, generates per-user local job numbers, and remembers for each user where the jobs have been submitted. A Print Spooler is a server that accepts Palladium operations from Print Clients using a DCE RPC and schedules print jobs on its Printer Supervisors. When the Spooler communicates with the Printer Supervisor, it uses the Palladium operations with the DCE RPC as well. In this case, the Print Spooler is the client and the Printer Supervisor is the server.

A Printer Supervisor accepts requests from clients (Print Spoolers) to print a job on its Physical Printer. If the code is multi-threaded, each thread is considered a Printer Supervisor and controls its own Physical Printer. Usually, a Printer Supervisor registers itself with a Spooler when it starts and is under the Spooler's control. However, a Printer Supervisor can be brought up in "stand-alone" mode, in which it does not register itself with a Spooler and accepts print jobs directly from Print Clients. In this case, the Printer Supervisor is a server acting as a Spooler without any queuing or job scheduling.

A Physical Printer is an actual piece of hardware that has its own Printer Supervisor controlling it. A Queue contains jobs waiting to be printed. When a Physical Printer finishes or nearly finishes a job, its Printer Supervisor indicates to the Spooler its readiness to accept another print job. The Spooler scans the queues that feed the Physical Printer and a scheduling algorithm selects the next job and assigns that job to that Physical Printer by submitting the print job to the Print Supervisor using an ISO DPA Print operation. A Logical Printer is the abstract entity that users specify to indicate where their job is to be printed and/or what characteristics their job has. Each logical printer has default attributes that the server supplies for those attributes that neither the user nor his Print Client has supplied. The Spooler may assign a print job to one or more Queues based on the specified Logical Printer, depending on the scheduling policy as established by its system administrator. In other words, a Logical Printer feeds one or more Queues; each Queue feeds one or more Physical Printers as established by the system administrator of the Spooler.

Referring still to FIG. 8, attributes of the developed job are maintained in a data store 152, and management of that data store, in other words, access to information in the data store, is provided by a document manager 154. As shown in FIG. 8, the document management system 150 is in communication with a subsystem process section 156, the section 156 including processes for, among other things, imaging, marking, finishing and diagnostics. In practice, a subsystem process is responsible for not only performing a certain function within the printing system, but for providing information about the occurrence of an event associated with that particular function. Consequently, a subsystem process, such as marking, would provide information about, among other things, the level of toner or ink available in any given printer or when a job has completed printing. Other subsystem processes such as diagnostics could inform the user of events such as jam in a paper path of one of the available printers. Yet other subsystem processes, such as a FAX service subsystem could provide information regarding the completion or transmission of a FAX. As will appear, the presently disclosed embodiment is pertinent for use with a large variety of document processing related events.

The subsystem process section 156 communicate with an agent 158, the agent 158 including a configuration table 160. Preferably, the agent 158 includes available SNMP (version 2) software and the configuration table is provided in accordance with such software. As will be appreciated by those skilled in the art, the configuration table (or tables) corresponds OIDs or "traps", with respective managers (clients) on the network. While the configuration table 160 preferably includes a plurality of tables, provided in accordance with an available SNMP (version 2) package, in other examples the table could simply comprise a look-up table associating the traps with the respective managers. Additionally, in the preferred embodiment, the agent 158 follows SNMP rules to access and obtain selected information from the configuration table(s).

Figure 9:
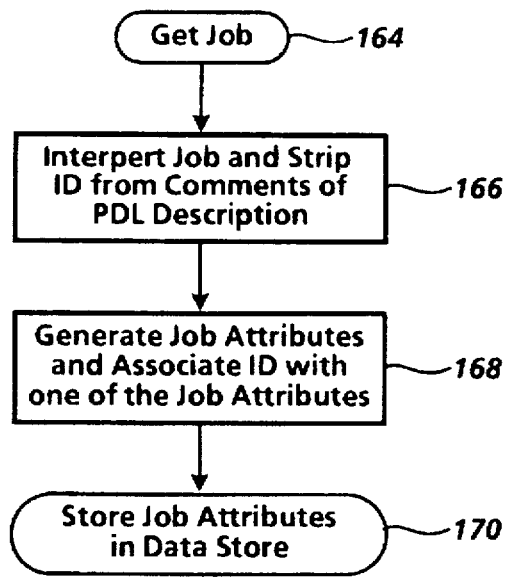
FIG. 9 is a flow diagram depicting a manner in which a job is interpreted at the print server of FIG. 8.
Figure 10:
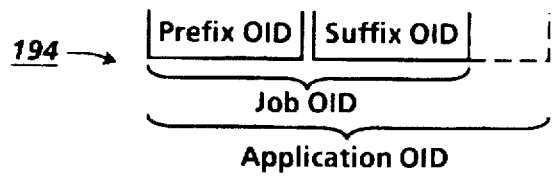
FIG. 10 is a schematic representation of an application object identifier of the type used in accordance with the present invention.

Referring to FIGS. 9 and 10 an approach for storing a job OID portion in the server 140 is shown. By way of step 164, a job is conveyed to the preparser 148 (FIG. 8) via a connectivity layer and interpretation of the job is begun. During such interpretation (step 166), a job OID portion is stripped from the comments section of the PDL description of the job. Referring specifically to FIG. 10, it will be recognized that, in the illustrated embodiment, a job OID includes a "prefix OID" and "suffix OID". In one example of operation, the prefix OID is maintained at the agent 158, while the suffix OID is provided to the print manager 100 (FIGS. 6 and 7), by the event handling subsystem 112. In accordance with the DPA standard discussed above, a set of job attributes is generated for the incoming job, at step 168, and the suffix OID is associated with one of the job attributes. In turn, at step 170, the job attributes generated in step 168 are, via 170, stored in the data storage 152 (FIG. 8).

Figure 11:
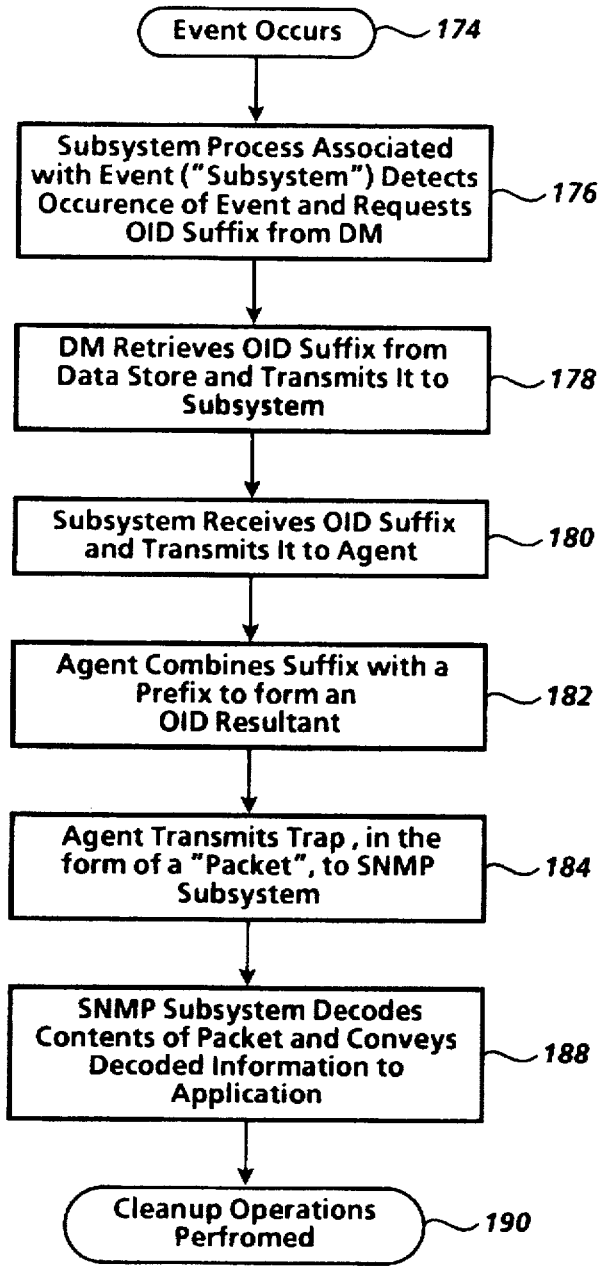
FIG. 11 is a flow diagram depicting a technique for notifying the client of FIG. 6 of the occurrence of an event in the printing system of FIG. 1.

Referring to FIGS. 6, 8 and 10, an approach for using SNMP (version 2) to inform a single client of the occurrence of an event at a printer remote to the single client is discussed. At step 174, (FIG. 11), an event occurs and the subsystem process associated with the event (FIG. 8) detects the occurrence of the events, at step 176, and requests a suitable OID suffix from the document manager ("DM") 154, the suffix specifically being associated with a trap indicating that the event has occurred. In response to the request from the subsystem process, the document manager retrieves the appropriate OID suffix from the data store 152 (step 178) and transfers it to the subsystem process of section 156 that has requested it. Upon receiving the OID suffix, the receiving subsystem process transmits the OID suffix, at step 180, to the agent 158. In turn, the agent 158 combines the suffix with a corresponding prefix to form an OID resultant or trap (step 182). As will be appreciated by those skilled in the art, the prefix OID includes various branches and leaves which, in combination, serve as an OID for a broad group of users on the network. It is the addition of the suffix OID to the prefix OID which makes the OID resultant particular to a single client on the network.

Preferably, the trap is obtained through use of conventional SNMP (version 2) software; however, when the OIDs are corresponded with traps by way of a look-up table, the more complex approach contemplated by SNMP (version 2) need not be followed. With the trap obtained in step 182, a message, assuming the form of a "packet" is transmitted from the agent, across the network to the SNMP subsystem 114 (FIG. 6) of the workstation 81. In turn, the SNMP subsystem decodes the contents of the packet, at step 188, and conveys the decoded information to the application 110. Preferably, the application 110 cooperates with a user interface of the workstation 81 (not shown) in such a way that the user of workstation 81 is provided with the essential information of the packet as soon as possible. Referring to step 190, when the application 110 (or emitter 84) closes, a cleanup routine is called in an event handling library of event handling subsystem 112. In one example, the cleanup routine cleans up the entries in local and remote configuration databases, thus disabling traps between the two entities. If this cleanup cannot happen (as in the case of a crash), the entries will be cleaned up when each side is reset. Until such time, spurious traps generated by the service 140 (FIG. 8) will be ignored by the client.

Referring again to FIG. 10, it should be understood that in one embodiment the event handling subsystem 112 provides the print imager 100 with the same suffix OID for each job to be developed at the emitter 84. Consequently, if a user sends many jobs from the workstation 81 of FIG. 6 to the print service 140 of FIG. 8, in a short period of time, upon receiving a trap subsequently it may not be clear to the user to which job that trap applies. Accordingly, it has been found that when many jobs are to be transmitted by the user it is advisable to configure the suffix OID with an additional portion 194 so that a specific OID, which corresponds to a particular job, is provided. As will be recognized, a trap corresponded with the specific OID would permit identification of a particular trap as being associated with a unique job.

Numerous features of the above-disclosed embodiment will be appreciated by those skilled in the art:

First, the subject system permits a client and an agent to interact exclusively across a network. Accordingly, an event affecting only one client is conveyed to that one client rather than a group of clients on the network. Accordingly, the amount of "traffic" on the network is minimized.

Second, the client and agent interact cooperatively to facilitate the above-mentioned exclusivity. More particularly, the client provides a server with a suffix object identifier ("OID") and, when a selected event occurs, that suffix OID is combined with a prefix OID, maintained by the agent, so that a resultant OID, particular to the client, is created. In turn, the resultant OID is used to obtain a trap that is provided to just the client.

Third, the suffix OIDs are made available to the server in a convenient manner. In one example, a suffix OID is embedded in a comment section of a job expressed in a page description language. In this way the suffix OID can be stripped readily from from the job during parsing at the server.

Finally, the OIDs can be configured so that a client is provided with a specific indication regarding a job with which a given trap is associated. In this way, the client is not forced to conjecture to which job a given trap belongs.

What is claimed is:

1. In a network document processing system, a status reporting system using simple network management protocol ("SNMP") to report the occurrence of a selected event relative to the document processing system, comprising:

(a) a first SNMP unique identifier;

(b) an agent communicating with the network, the first SNMP being made accessible to said agent;

(c) a document processing server communicating with the network;

(d) a client communicating with the network, said client,
  (i) registering at least an SNMP trap identifier with said agent, the SNMP trap identifier being associated with the selected event, and (ii) transmitting a job written in a page description language ("PDL") to said document processing server, wherein a second SNMP unique identifier is embedded by said client in a PDL file representative of the job, and said server, upon receiving the job, extracts the second SNMP unique identifier from the PDL file representative of the job for storage in memory;

(e) in response to the occurrence of the selected event, said document processing server causes the first and second SNMP unique identifiers to be combined for forming the SNMP trap identifier; and (f) in response to said combination, said agent transmits a copy of the SNMP trap identifier to said client for notifying said client of the occurrence of the selected event.

2. The network document processing system of claim 1, wherein the first SNMP unique identifier comprises a SNMP prefix object identifier and the second SNMP unique identifier comprises a SNMP suffix object identifier.

3. The network document processing system of claim 1, wherein said document processing server comprises a print server.

4. The network document processing system of claim 1, wherein the PDL file includes a comment section and the second SNMP unique identifier is embedded in the comment section.

5. The network document processing system of claim 1, in which said document processing server includes a document processing system process, wherein said document processing system process, in response to the occurrence of the selected event, causes the first SNMP unique identifier to be retrived for combination with the second SNMP unique identifier.

* * * * *